(12) United States Patent
Zhuang et al.

(10) Patent No.: US 8,866,985 B2
(45) Date of Patent: Oct. 21, 2014

(54) DISPLAY PANEL AND REPAIR METHOD THEREOF

(75) Inventors: Yizhuang Zhuang, Shenzhen (CN); Songxian Wen, Shenzhen (CN); Mingfeng Deng, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 468 days.

(21) Appl. No.: 13/263,889

(22) PCT Filed: Jun. 30, 2011

(86) PCT No.: PCT/CN2011/076612
§ 371 (c)(1),
(2), (4) Date: Oct. 11, 2011

(65) Prior Publication Data
US 2012/0300165 A1 Nov. 29, 2012

(30) Foreign Application Priority Data

May 23, 2011 (CN) .......................... 2011 1 0134025

(51) Int. Cl.
G02F 1/1333 (2006.01)
G02F 1/1343 (2006.01)
G02F 1/13 (2006.01)
G02F 1/1362 (2006.01)

(52) U.S. Cl.
CPC ............. *G02F 1/136259* (2013.01); *G02F 2001/136263* (2013.01); *G02F 2001/136272* (2013.01)

USPC .............................. 349/54; 349/55; 349/192

(58) Field of Classification Search
USPC .............................. 349/54, 55, 192
See application file for complete search history.

(56) References Cited

U.S. PATENT DOCUMENTS

| | | | |
|---|---|---|---|
| 5,303,074 A | * | 4/1994 | Salisbury ..................... 349/55 |
| 2007/0259455 A1 | * | 11/2007 | Chen et al. ..................... 438/4 |
| 2011/0194041 A1 | * | 8/2011 | Cheng et al. ................ 349/38 |

FOREIGN PATENT DOCUMENTS

| | | |
|---|---|---|
| JP | 10123563 A | 5/1998 |
| JP | 2003222905 A | 8/2003 |

* cited by examiner

*Primary Examiner* — Hoan C Nguyen
(74) *Attorney, Agent, or Firm* — Muncy, Geissler, Olds & Lowe, P.C.

(57) ABSTRACT

A flat display panel and a related repairing method are provided. The flat display panel includes multiple horizontal repair lines parallel to scan lines and multiple vertical repair lines parallel to data lines. The vertical repair lines are disposed on one side of the data lines one to one, and the horizontal repair lines are disposed on one side of the scan lines one to one. When one of the data lines or one of the scan lines is broken, an electrical route formed by a use of the vertical repair lines or the horizontal repair lines detours the broken scan line or data line, so as to deliver signal to pixel electrode normally.

10 Claims, 10 Drawing Sheets

DISPLAY PANEL AND REPAIR METHOD THEREOF

CROSS-REFERENCE TO RELATED APPLICATIONS

This application is the National Stage of International Application No. PCT/CN2011/076612 filed Jun. 30, 2011, which claims the benefit of Chinese Application No. 201110134025.7, filed May 23, 2011, the disclosures of which are incorporated herein by reference in their entireties.

BACKGROUND OF THE INVENTION

1. Field of the Invention

The present invention relates to a flat display panel and a repair method thereof, and more particularly, to a flat display panel with a structure having repair lines and a method of repairing broken lines thereof.

2. Description of the Prior Art

An advanced monitor with multiple functions is an important feature for use in current consumer electronic products. Liquid crystal displays (LCDs) which are colorful monitors with high resolution are widely used in various electronic products such as monitors for mobile phones, personal digital assistants (PDAs), digital cameras, laptop computers, and notebook computers.

A thin-film transistor liquid crystal display (TFT-LCD) panel has gradually become a mainstream product in the consumer electronics market because it has many advantages, such as high quality, efficient utilization of space, low consumption power, and no radiation. Refer to FIG. 1, which is a partial schematic diagram of a conventional LCD panel. The conventional LCD panel comprises a plurality of pixel electrodes 100, a plurality of data lines 102, and a plurality of scan lines 101. Each of the plurality of pixel electrodes 100 is connected to a scan line 101 and to a data line 102 through a TFT 103. The TFT 103 is brought into conduction or cutoff in response to a scan signal transmitted through the scan line 101. When the scan signal transmitted through the scan line 101 is at a high level, the TFT 103 conducts, so that data voltage applied on the data line 102 can be output to each of the plurality of pixel electrodes 100. Liquid crystal (LC) molecules between each of the plurality of pixel electrodes 100 and a common line 105 rotate to display different gray levels based on a voltage difference between the data voltage received by each of the plurality of pixel electrodes 100 and voltage provided by the common line 105.

However, a breaking G sometimes occurs in the data line 102 or in the scan line 101 during the LCD panel manufacturing process. Generally speaking, chemical vapor deposition (CVD) repair is performed to repair a broken line found in the data line 102 or in the scan line 101 before cell processes are conducted. Otherwise, the LCD panel is scrapped nowadays if any of the data line 102 or the scan line 101 remains to be broken after cell processes are conducted, which causes unnecessary waste, affects the product yield, and increases the manufacturing cost of the LCD panel.

SUMMARY OF THE INVENTION

Therefore, an object of the present invention is to provide a flat display panel with a structure having repair lines and the method of repairing the broken lines thereof. After cell processes, laser is applied to cut and connect specific repair lines to bypass the breakings of the broken data line or scan line, so that signals which are unable to be transmitted through the broken data line or the broken scan line can be transmitted through the repair line. The flat display panel with a structure having repair lines and the method of repairing broken lines thereof can reduce scrapped products, thereby solving the problem occurring in the prior art.

According to the present invention, a flat display panel comprises a plurality of matrix-arranged pixel electrodes, a plurality of scan lines parallel to one another and extended along a first direction, a plurality of data lines parallel to one another and extended along a second direction, the second direction being perpendicular to the first direction, a plurality of switching transistors coupled to the plurality of pixel electrodes, to the plurality of scan lines, and to the plurality of data lines one to one, a plurality of horizontal repair lines, parallel to the plurality of scan lines, and a plurality of vertical repair lines, parallel to the plurality of data lines. Each of the plurality of switching transistors is used for receiving the scan signal transmitted through each of the plurality of scan lines coupled to each of the plurality of switching transistors and for conducting the data signal transmitted through each of the plurality of data lines coupled to each of the plurality of switching transistors to the corresponding pixel electrode. The plurality of horizontal repair lines are disposed on one side of the plurality of scan lines one to one. The plurality of vertical repair lines are disposed on one side of the plurality of data lines one to one. A first horizontal repair line is selected from the plurality of horizontal repair lines while a first vertical repair line and a second vertical repair line are selected from the plurality of vertical repair lines, when one of the plurality of scan lines is detected to be a broken scan line, causing a pixel electrode unable to receive the scan signal. The first and second vertical repair lines are disposed on both sides of the pixel electrode, respectively. A first cutting zone and a second cutting zone are formed on the first horizontal repair line. A third cutting zone and a fourth cutting zone are formed on the first vertical repair line. A fifth cutting zone and a sixth cutting zone are formed on the second vertical repair line. The first and second vertical repair lines are located between the first and second cutting zones. The first horizontal repair line and the broken scan line are located between the third and fourth cutting zones as well as between the fifth and sixth cutting zones. The first and second vertical repair lines, respectively, are electrically connected to the broken scan line and the first horizontal repair line at their overlapping areas.

According to the present invention, a flat display panel comprises a plurality of matrix-arranged pixel electrodes, a plurality of scan lines parallel to one another and extended along a first direction, a plurality of data lines parallel to one another and extended along a second direction, the second direction being perpendicular to the first direction, a plurality of switching transistors coupled to the plurality of pixel electrodes, to the plurality of scan lines, and to the plurality of data lines one to one, a plurality of horizontal repair lines, parallel to the plurality of scan lines, and a plurality of vertical repair lines, parallel to the plurality of data lines. Each of the plurality of switching transistors is used for receiving the scan signal transmitted through each of the plurality of scan lines coupled to each of the plurality of switching transistors and for conducting the data signal transmitted through each of the plurality of data lines coupled to each of the plurality of switching transistors to the corresponding pixel electrode. The plurality of horizontal repair lines are disposed on one side of the plurality of scan lines one to one. The plurality of vertical repair lines are disposed on one side of the plurality of data lines one to one.

According to the present invention, a method of repairing a flat display panel is proposed. The flat display panel comprises a plurality of matrix-arranged pixel electrodes, a plurality of scan lines parallel to one another and extended along a first direction, a plurality of data lines parallel to one another and extended along a second direction, a plurality of switching transistors, a plurality of horizontal repair lines parallel to the plurality of scan lines, and a plurality of vertical repair lines parallel to the plurality of data lines. The second direction is perpendicular to the first direction. The plurality of switching transistors coupled to the plurality of pixel electrodes, to the plurality of scan lines, and to the plurality of data lines one to one. Each of the plurality of switching transistors are used for receiving the scan signal transmitted through each of the plurality of scan lines coupled to each of the plurality of switching transistors and for conducting the data signal transmitted through each of the to plurality of data lines coupled to each of the plurality of switching transistors to the corresponding pixel electrode. The plurality of horizontal repair lines are disposed on one side of the plurality of scan lines one to one. The plurality of vertical repair lines are disposed on one side of the plurality of data lines one to one. The method comprises the step of: detecting whether any of the plurality of the scan line is to be a broken scan line; selecting a first horizontal repair line from the plurality of horizontal repair lines and selecting a first vertical repair line and a second vertical repair line front the plurality of vertical repair lines, when one of the plurality of scan lines is detected to he the broken scan line, causing a pixel electrode unable to receive the scan signal, the first and second vertical repair lines being disposed on both sides of the pixel electrode, respectively; forming a first cutting zone and a second cutting zone on the first horizontal repair line, forming a third cutting zone and a fourth cutting zone on the first vertical repair line, forming a fifth cutting zone and a sixth cutting zone on the second vertical repair line, the first and second vertical repair lines being located between the first and second cutting zones, the first horizontal repair line and the broken scan line being located between the third and fourth cutting zones as well as between the fifth and sixth cutting zones; connecting the first and second vertical repair lines with the broken scan line and the first horizontal repair line at their overlapping areas, respectively.

According to the present invention, a method of repairing a flat display panel is proposed. The flat display panel comprises a plurality of matrix-arranged pixel electrodes, a plurality of scan lines parallel to one another and extended along a first direction, a plurality of data lines parallel to one another and extended along a second direction, a plurality of switching transistors, a plurality of horizontal repair lines parallel to the plurality of scan lines, and a plurality of vertical repair lines parallel to the plurality of data lines. The second direction is perpendicular to the first direction. The plurality of switching transistors coupled to the plurality of pixel electrodes, to the plurality of scan lines, and to the plurality of data lines one to one. Each of the plurality of switching transistors are used for receiving the scan signal transmitted thro each of the plurality of scan lines coupled to each of the plurality of switching transistors and for conducting the data signal transmitted through each of the plurality of data tines coupled to each of the plurality of switching transistors to the corresponding pixel electrode. The plurality of horizontal repair lines are disposed on one side in of the plurality of scan lines one to one. The plurality of vertical repair lines are disposed on one side of the plurality of data lines one to one. The method comprises the step of: detecting whether any of the plurality of the data line is to be a broken data line; selecting a first horizontal repair line and a second horizontal repair line from the plurality of horizontal repair lines and selecting a first vertical repair line from the plurality of vertical repair lines, when one of the plurality of data lines is detected to be the broken data line, causing a pixel electrode unable to receive the scan signal, the first and second horizontal repair lines being disposed on both sides of the pixel electrode, respectively; forming a first cutting zone and a second cutting zone on the first vertical repair line, forming a third cutting zone and a fourth cutting zone on the first horizontal repair line, forming a fifth cutting zone and a sixth cutting zone on the second horizontal repair line, the first and second horizontal repair lines and the pixel electrode being located between the first and second cutting zones, the first vertical repair line and the broken data flue being located between the third and fourth cutting zones as well as between the fifth and sixth cutting zones; connecting the first and second horizontal repair lines with the broken data line and the first vertical repair line at their overlapping areas, respectively.

In one aspect of the present invention, the steps of forming the first cutting zone, the second cutting zone, forming the third cutting zone and the fourth cutting zone, and forming the fifth cutting zone and the sixth cutting zone are performed by using laser. The steps of connecting the first and second horizontal repair lines with the broken data line and the first vertical repair line are performed by using laser.

In contrast to prior art, the present invention proposes a flat display panel with a structure having repair lines and the method of repairing the broken lines thereof. By using laser to cut any broken data line or scan line and then to connect specific repair lines, so that data signal or scan signal which is unable to be transmitted through the broken data line or the broken scan line can be transmitted through the repair lines. The flat display panel with a structure having repair lines and the method of repairing broken lines thereof can reduce scrapped products.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may he used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
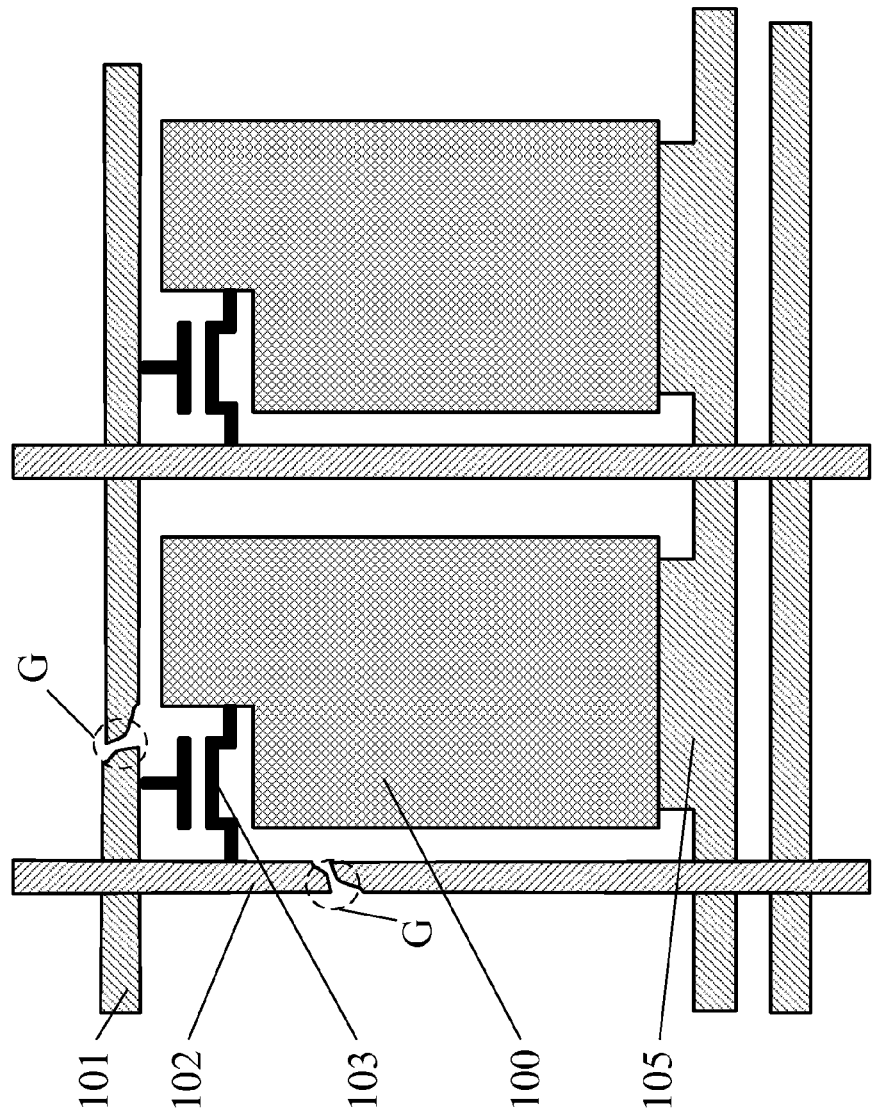
FIG. 1 is a partial schematic diagram of a conventional LCD panel.
Figure 2:
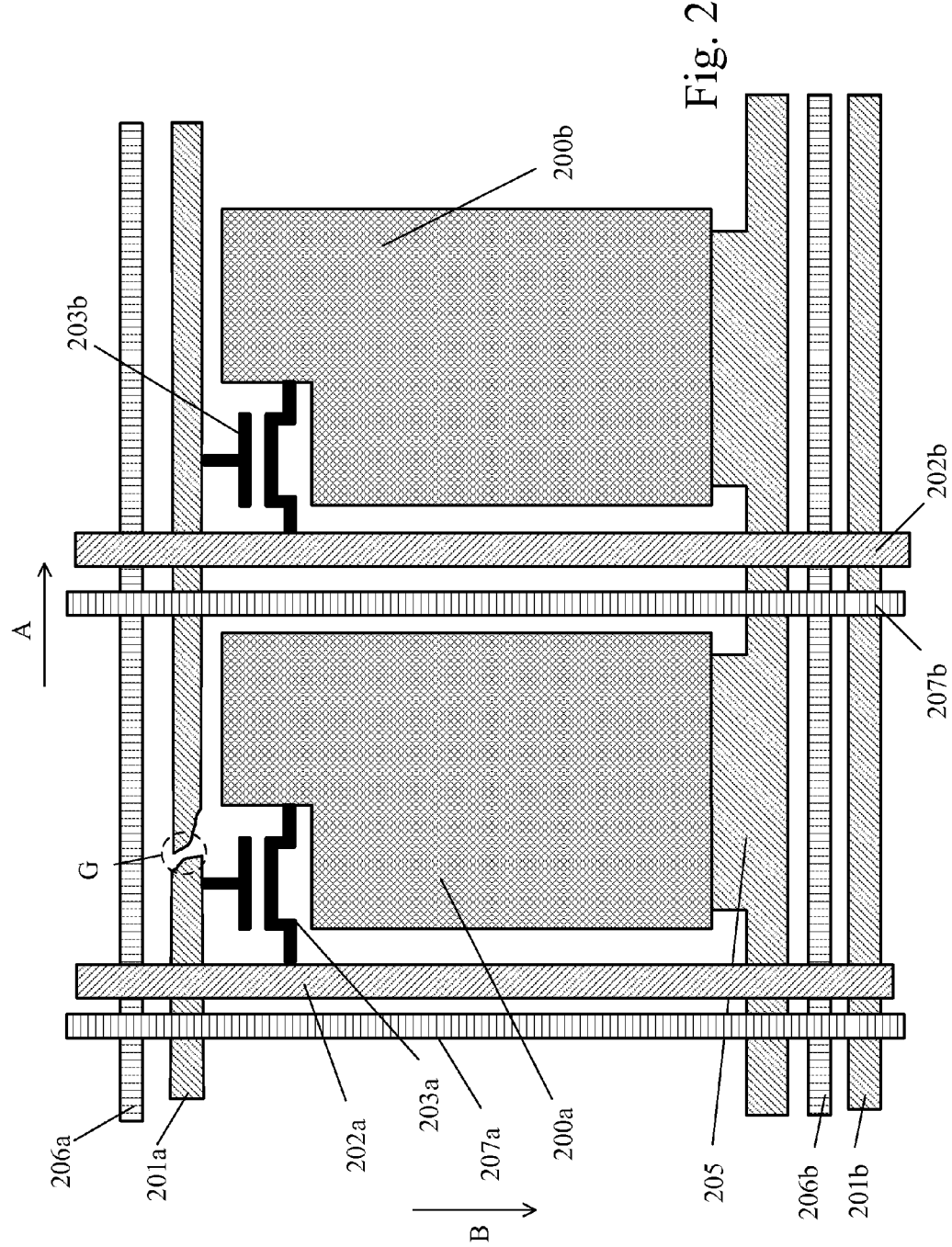
FIG. 2 is a partial schematic diagram of a flat display panel with a structure having repair lines before a broken scan line is repaired according to the present invention.

Please refer to FIG. 2 which is a partial schematic diagram of a flat display panel with a structure having repair lines before a broken scan line is repaired according to the present invention. The flat display panel comprises a plurality of pixel electrodes and hundreds of scan lines, data lines, common lines, horizontal repair lines, and vertical repair lines. For brevity and for facilitating explanations, the flat display panel is partially illustrated in the following embodiments. The flat display panel comprises a plurality of pixel electrodes 200a and 200b in a matrix alignment, a plurality of scan lines 201a and 201b parallel to one another and extended along a first direction A, a plurality of data lines 202a and 202b parallel to one another and extended along a second direction B, a plurality of switching transistors 203a and 203b, a plurality of horizontal repair lines 206a and 206b parallel to the scan line 201a, and a plurality of vertical repair lines 207a and 207b parallel to the data line 202a. The second direction B is perpendicular to the first direction A. Preferably, the switching transistor 203a is TFT. The switching transistor 203a has agate coupled to the scan line 201a, a source coupled to the data line 202a, and admin coupled to the pixel electrode 200a. The structure and connecting relation of the switching transistor 203b is the same as that of the switching transistor 203a, so no further details are released hereafter. When the switching transistor 203a receives a scan signal transmitted through the scan line 201a coupled to the switching transistor 203a, the switching transistor 203a conducts a data signal transmitted through the data line 202a coupled to the switching transistor 203a to the corresponding pixel electrode 200a. A common line 205 outputs common voltage Vcom. Liquid crystal (LC) molecules between the pixel electrode 200a and the common line 205 rotate to display different gray levels based on a voltage difference between the common voltage Vcom provided by the common line 205 and data voltage received by the pixel electrode 200a.

In cell processes, the photoengraving process (PEP) with a mask is used to form a plurality of scan lines 201a and 201b and a plurality of horizontal repair lines 206a and 206b simultaneously. The plurality of horizontal repair lines 206a and 206b are disposed on one side of the plurality of scan lines 201a and 201b one to one. Next, the PEP with another mask is used to form a plurality of data lines 202a and 202b and a plurality of vertical repair lines 207a and 207b simultaneously. The plurality of vertical repair lines 207a and 207b are disposed on one side of the plurality of data lines 202a and 202b one to one. Each of the plurality of scan lines 201a and 201b and each of the plurality of data lines 202a and 202b axe probed if each of the lines is able to transmit signals normally during the cell process. Once the scan line 201a is broken, as seen in a breaking G of FIG. 2, semi signals cannot he transmitted to the switching transistor 203b.

Figure 3:
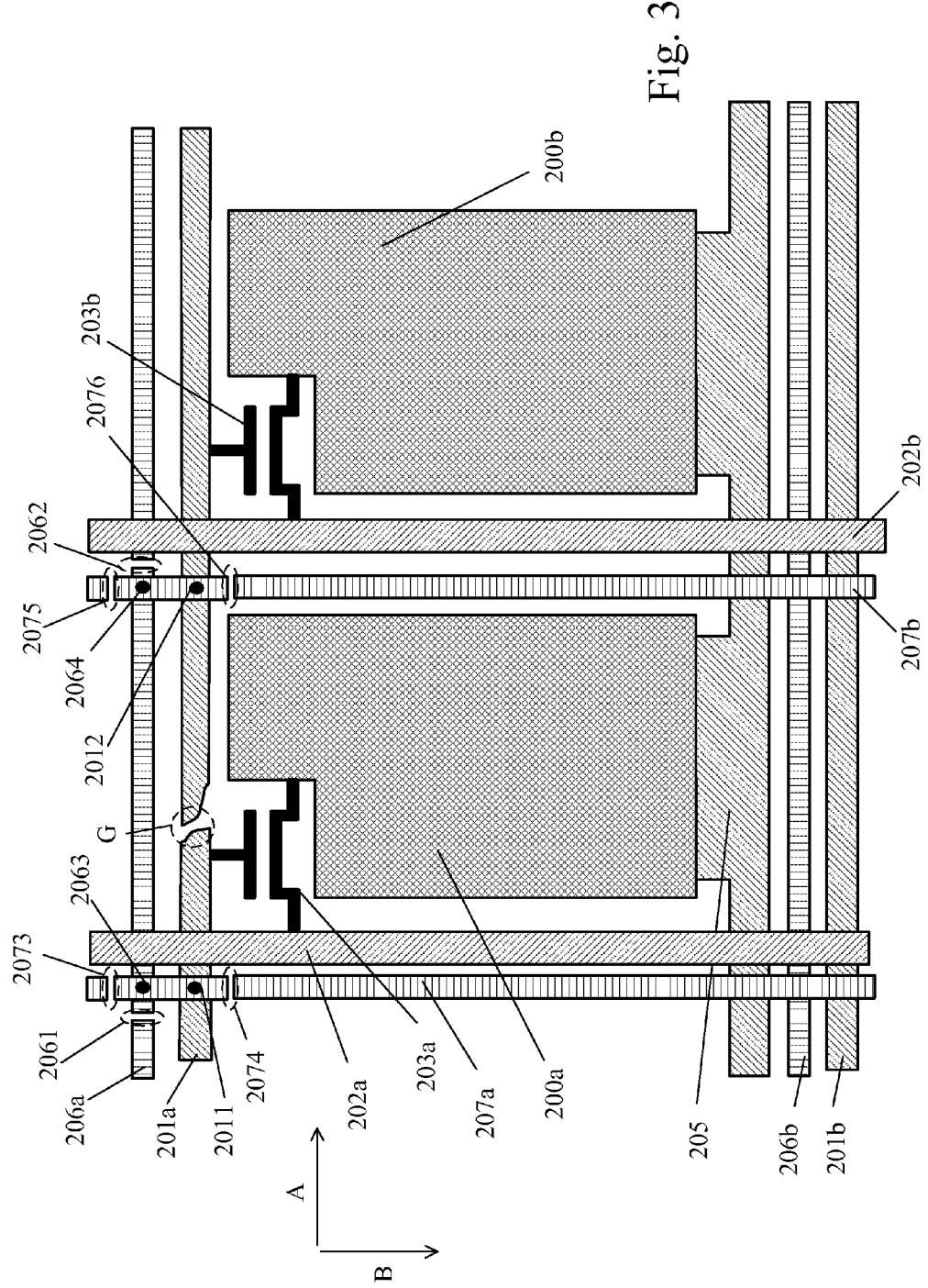
FIG. 3 is a schematic diagram showing that the flat display panel in FIG. 2 has undergone repairs according to a first embodiment of the present invention.

Refer to FIG. 3, which is a schematic diagram showing that the flat display panel in FIG. 2 has undergone repairs according to a first embodiment of the present invention. If one of the plurality of scan lines 201a is probed to have the breaking the pixel electrode 200a cannot receive scan signals. At this time, any one of the plurality of horizontal repair lines is chosen as a first horizontal repair line, and any two of the plurality of vertical repair lines are chosen as a first and a second vertical repair line. In this embodiment, the horizontal repair line 206a is selected as a first horizontal repair line, and the vertical repair lines 207a and 207b are selected as a first and a second vertical repair line, respectively. Note that the first vertical repair line 207a and the second vertical repair line 207b have to be disposed on both sides of the pixel electrode 200a connected to the broken scan line 201a.

Afterwards, laser cutting is performed on the first horizontal repair line 206a to forma first cutting zone 2061 and a second cutting zone 2062. Laser cutting is also performed on the first vertical repair line: 207a and the second vertical repair line 207b at both sides of the pixel electrode 200a to form a third cutting zone 2073 and a fourth cutting zone 2074, and a fifth cutting zone 2075 and a sixth cutting zone 2076, respectively. The two vertical repair lines 207a and 207b and the pixel electrode 200a are located between the first cutting zone 2061 and the second cutting zone 2062. The first horizontal repair line 206a and the broken scan line 201a are located between the third cutting zone 2073 and the fourth cutting zone 2074 as well as between the fifth cutting zone 2075 and the sixth cutting zone 2076.

Next, laser is performed on the overlapping area 2011 of the first vertical repair line 207a and the broken scan line 201a to connect the two lines, on the overlapping area 2063 of the first vertical repair line 207a and the first horizontal repair line 206a to connect the two lines, on the overlapping area 2012 of the second vertical repair line 207b and the broken scan line 201a to connect the two lines, and finally on the overlapping area 2064 of the second vertical repair line 207b and the first horizontal repair line 206a to connect the two lines. As described above, the two vertical repair lines 207a and 207b and the horizontal repair line 206a form a bypass route to bypass the breaking G on the scan line 201a, so that scan signals can detour the breaking G on the scan line 201a and be transmitted smoothly through the bypass route.

Figure 4:
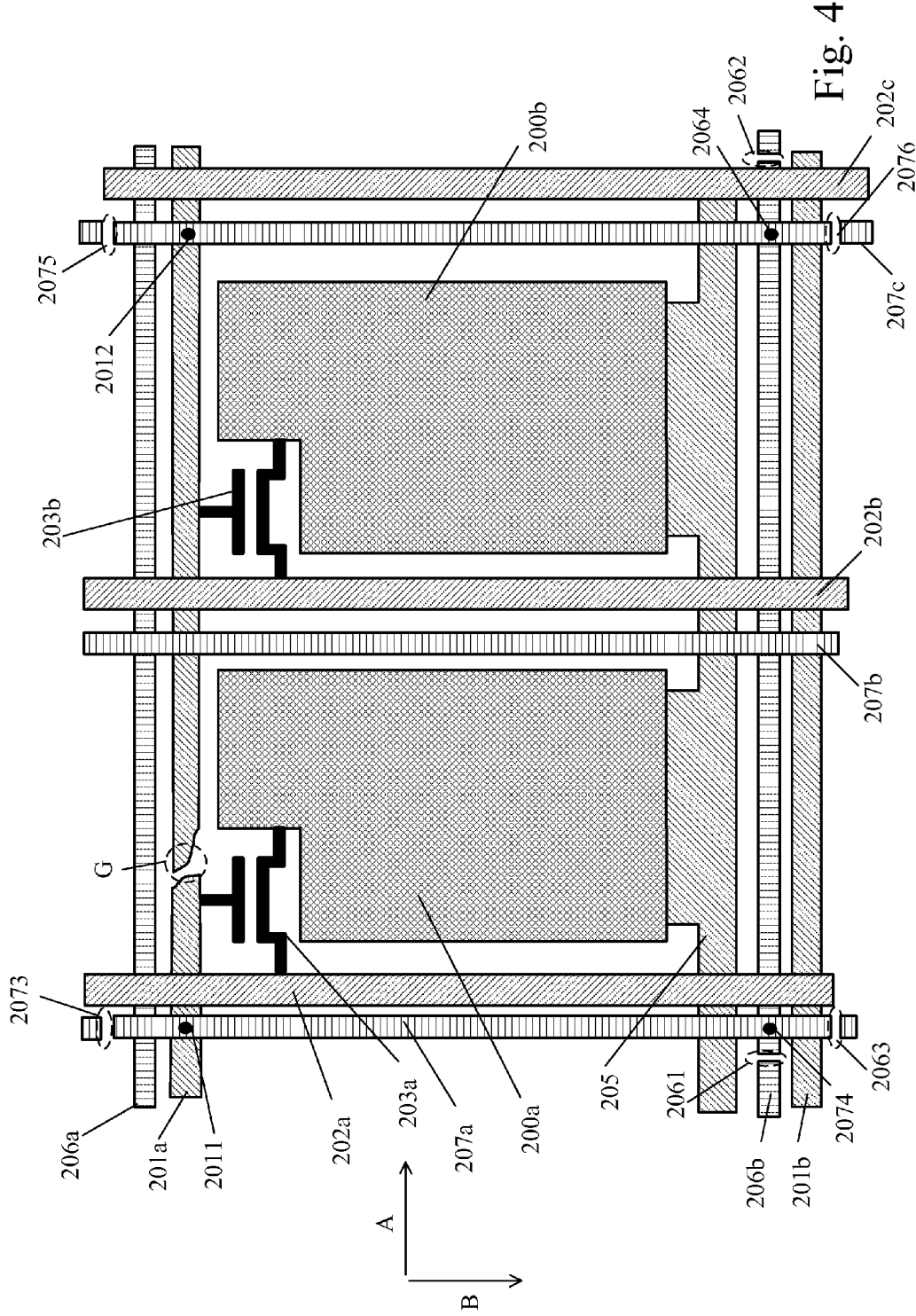
FIG. 4 is a schematic diagram showing that the flat display panel in FIG. 2 has undergone repairs according to a second embodiment according to the present invention.

Refer to FIG. 4, which is a schematic diagram showing that the flat display panel in FIG. 2 has undergone repairs according to a second embodiment according to the present invention. The horizontal repair line 206b is chosen from the plurality of horizontal repair lines and is serves as a first horizontal repair line. The vertical repair lines 207a and 207c are chosen from the plurality of vertical repair lines and serve as a first and a second vertical repair line according to another embodiment. The first vertical repair line 207a and the second vertical repair line 207c have to be disposed on both sides of the pixel electrode 200a connected to the broken scan line 201a.

Afterwards, laser cutting is performed on the first horizontal repair line 206a to form a first cutting zone 2061 and a second cutting zone 2062. Laser cutting is also performed on the first vertical repair line 207a and the second vertical repair line 207c at both sides of the pixel electrode 200a to form a third cutting zone 2073 and a fourth cutting zone 2074, and a fifth cutting zone 2075 and a sixth cutting zone 2076, respectively. The two vertical repair lines 207a and 207c and the pixel electrode 200a are located between the first cutting zone 2061 and the second cutting zone 2062. The first horizontal repair line 206a and the broken scan line 201a are located between the third cutting zone 2073 and the fourth cutting zone 2074 as well as between the fifth cutting zone 2075 and the sixth cutting zone 2076.

Next, laser is applied on the overlapping area 2011 of the first vertical repair line 207a and the broken scan line 201a to connect the two lines, on the overlapping area 2063 of the first vertical repair line 207a and the first horizontal repair line 206a to connect the two lines, on the overlapping area 2012 of the second vertical repair line 207e and the broken scan line 201a to connect the two lines, and finally on the overlapping area 2064 of the second vertical repair line 207c and the first horizontal repair line 206a to connect the two lines. As described above, the two vertical repair lines 207a and 207c and the horizontal repair line 206a form a bypass route to bypass the breaking G on the scan line 201a, so that scan signals can detour the breaking G on the scan line 201a and be transmitted smoothly through the bypass route.

It is notified that only one horizontal repair line and two vertical repair lines near the broken scan line 201a are chosen to be exemplified in FIG. 3 and FIG. 4 for brevity. However, it can be found in FIG. 3 and FIG. 4 that, for any broken scan line, it practically allows to choose any two of the plurality of vertical repair lines at both sides of the pixel electrode connected to the broken scan line as well as any one of the plurality of horizontal repair lines to form a bypass route to bypass the breaking G on the scan line.

Figure 5:
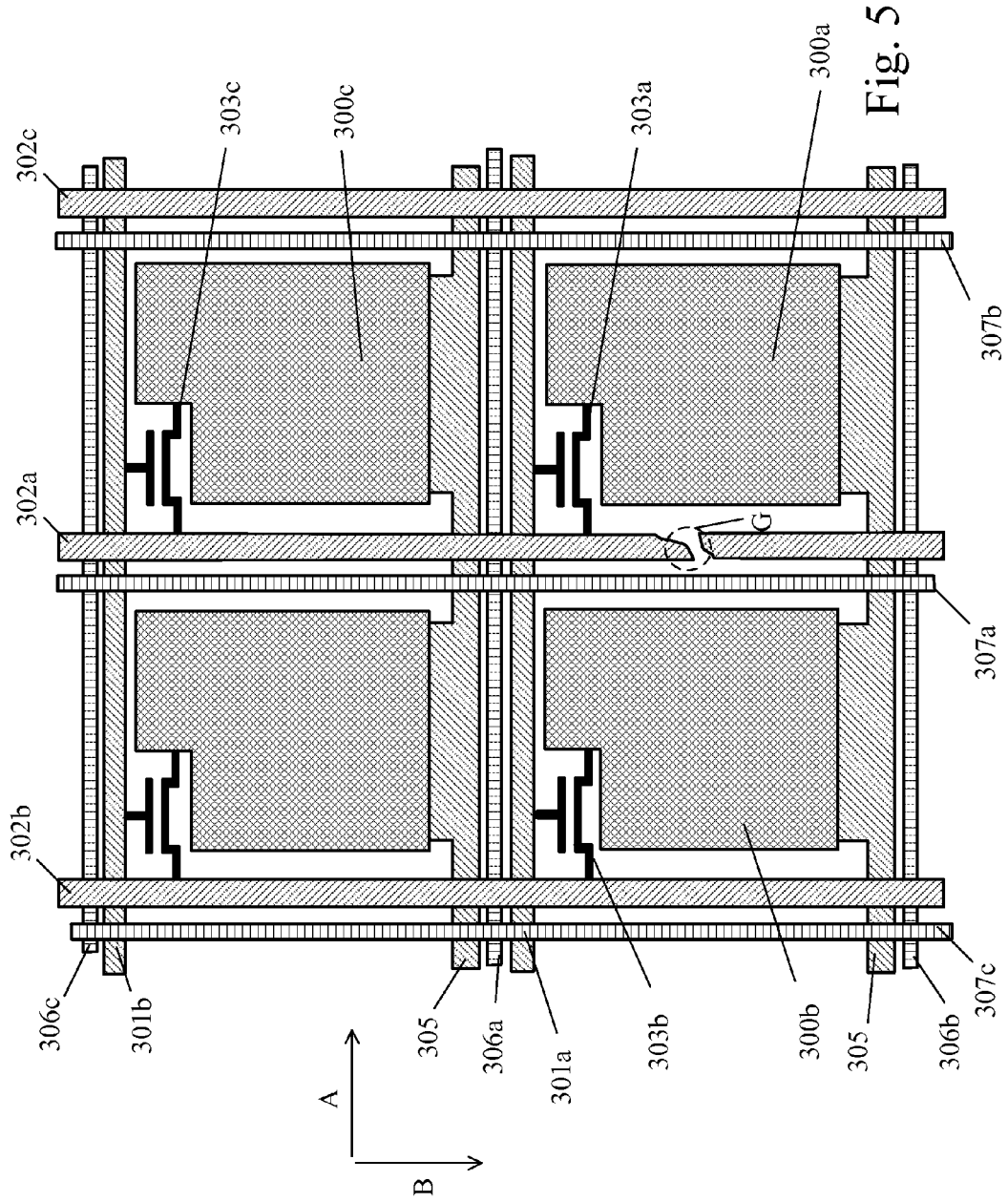
FIG. 5 is a partial schematic diagram of a flat display panel with a structure having repair lines before broken data lines are repaired according to the present invention.

Refer to FIG. 5, which is a partial schematic diagram of a flat display panel with a structure having repair lines before broken data lines are repaired according to the present invention. The flat display panel comprises a plurality of pixel electrodes 300a and 300b, a plurality of scan lines 301a, 301b, and 3010 parallel to one another and extended along a first direction A, a plurality of data lines 302a, 302b, and 302c parallel to one another and extended along a second direction B, a plurality of switching transistors 303a, 303b, and 303c, a plurality of horizontal repair lines 306a, 306b, and 306e parallel to the scan line 301a, and a plurality of vertical repair lines 307a, 307b, and 307c parallel to the data line 302a. The second direction B is perpendicular to the first direction A. The switching transistor 303a can be a TFT. The switching transistor 303a has agate coupled to the scan line 301a, a source coupled to the data line 302a, and a drain coupled to the pixel electrode 300a. The structure and connecting relation of the switching transistors 303b and 303e is the same as that of the switching transistor 303a, so no further details are released hereafter. When the switching transistor 303a receives a scan signal transmitted through the scan line 301a coupled to the switching transistor 303a, the switching transistor 303a conducts a data signal transmitted through the data line 302a coupled to the switching transistor 303a to the corresponding pixel electrode 300a. A common line 305 outputs common voltage Vcom. LC molecules between the pixel electrode 300a and the common line 305 rotate to display different gray levels based on a voltage difference between the common voltage Vcom provided by the common line 305 and data voltage received by the pixel electrode 300a.

In cell processes, the PEP with a mask is used to form a plurality of scan lines 301a, 301b, and 301c and a plurality of horizontal repair lines 306a, 306b, and 306e simultaneously. The plurality of horizontal repair lines 306a, 306b, and 306c are disposed on one side of the plurality of scan lines 301a, 301b, and 301c one to one. Next, the PEP with another mask is used to form a plurality of data lines 302a, 302b, and 302c and a plurality of vertical repair lines 307a, 307b, and 307c simultaneously. The plurality of vertical repair lines 307a, 307b, and 307c are disposed on one side of the plurality of data lines 302a, 302b, and 302c one to one. Each of the plurality of scan lines 301a and 301b and each of the plurality of data lines 302a and 302b are detected to see if each of the lines is able to transmit signals normally during the cell process. Once the data line 302a is broken, data signals cannot be transmitted, as a breaking G in FIG. 5 shows.

Figure 6:
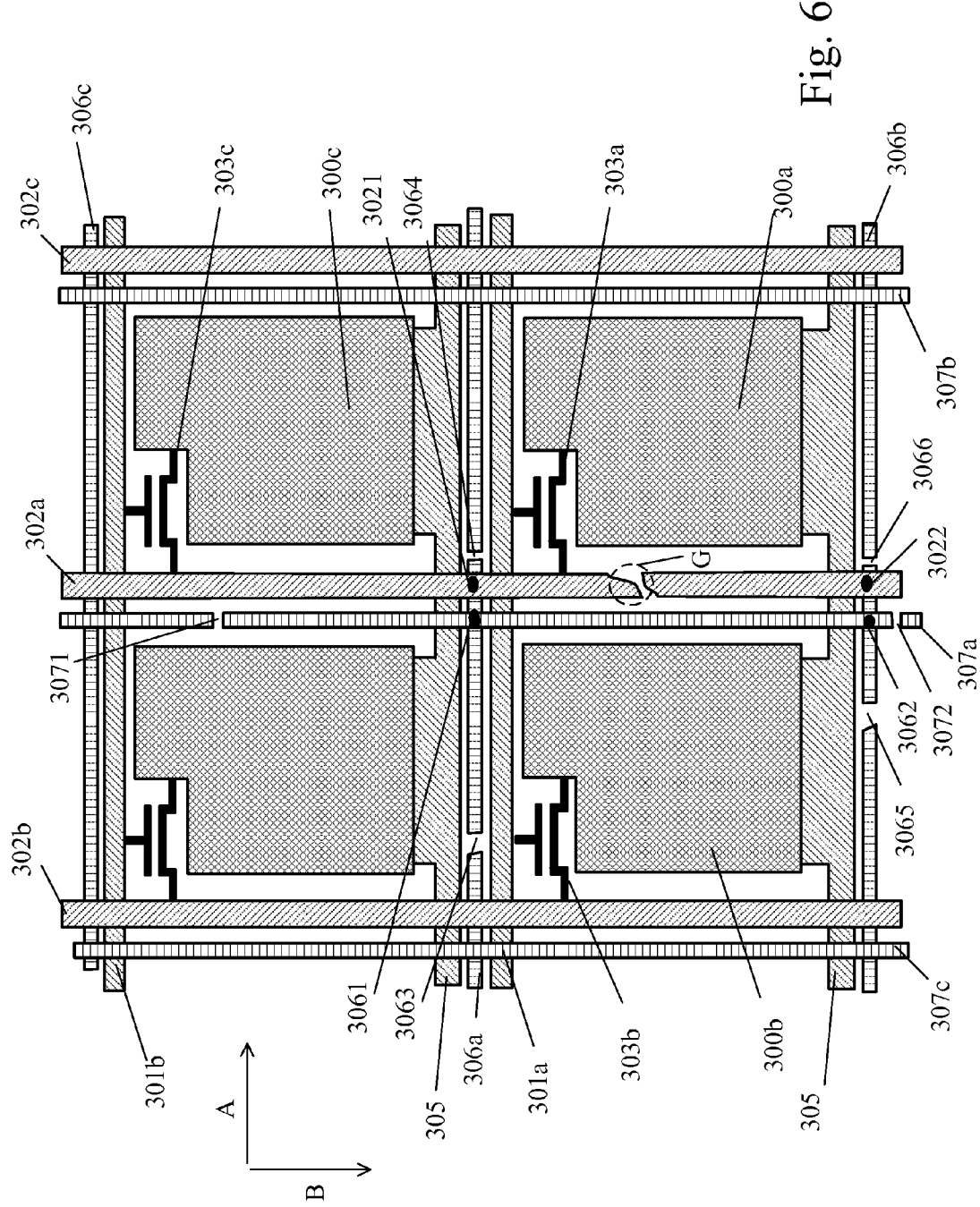
FIG. 6 is a schematic diagram showing that the flat display panel in FIG. 5 has undergone repairs according to a third embodiment of the present invention.

Refer to FIG. 6, which is a schematic diagram showing that the flat display panel in FIG. 5 has undergone repairs according to a third embodiment of the present invention. If one data lines 302a is found to have the breaking G; the pixel electrode 300a cannot receive data signals. At this time, any two of the plurality of horizontal repair lines are chosen as a first and a second horizontal repair line, and any one of the plurality of vertical repair lines is chosen as a first vertical repair line. In this embodiment, the horizontal repair lines 306a and 306b are selected as a first and a second horizontal repair line, and the vertical repair line 307a is selected as a first vertical repair line. The first horizontal repair lines 306a and the second horizontal repair line 306b have to be disposed on both sides of the pixel electrode 300a which is connected to the broken data line 302a.

Afterwards, laser cutting is performed on the first vertical repair line 307a to form a first cutting zone 3071 and a second cutting zone 3072. Laser cutting is also performed on the first horizontal repair line 306a and the second horizontal repair line 306b at both sides of the pixel electrode 300a to form a third cutting zone 3063 and a fourth cutting zone 3064, and a fifth cuffing zone 3065 and a sixth cutting zone 3066, respectively. The two horizontal repair lines 306a and 306b and the pixel electrode 300a are located between the first cutting zone 3071 and the second cutting zone 3072. The first vertical repair line 307a and the broken data line 302a are located between the third cutting zone 3063 and the fourth cutting zone 3064 as well as between the fifth cutting zone 3065 and the sixth cutting zone 3066.

Next, laser is applied on the overlapping area 3021 of the first horizontal repair line 306a and the broken data line 302a to connect the two lines, on the overlapping area 3061 of the first horizontal repair line 306a and the first vertical repair line 307a to connect the two lines, on the overlapping area 3022 of the second horizontal repair line 306b and the broken data line 302a to connect the two lines, and finally on the overlapping area 3062 of the second horizontal repair line 306b and the first vertical repair line 307a to connect the two lines. As to described above, the two vertical repair lines 306a and 306b and the vertical repair line 307a form a bypass route to bypass the breaking G on the data line 302a, so that data signals can detour the breaking G on the data line 302a and be transmitted smoothly through the bypass route.

Figure 7:
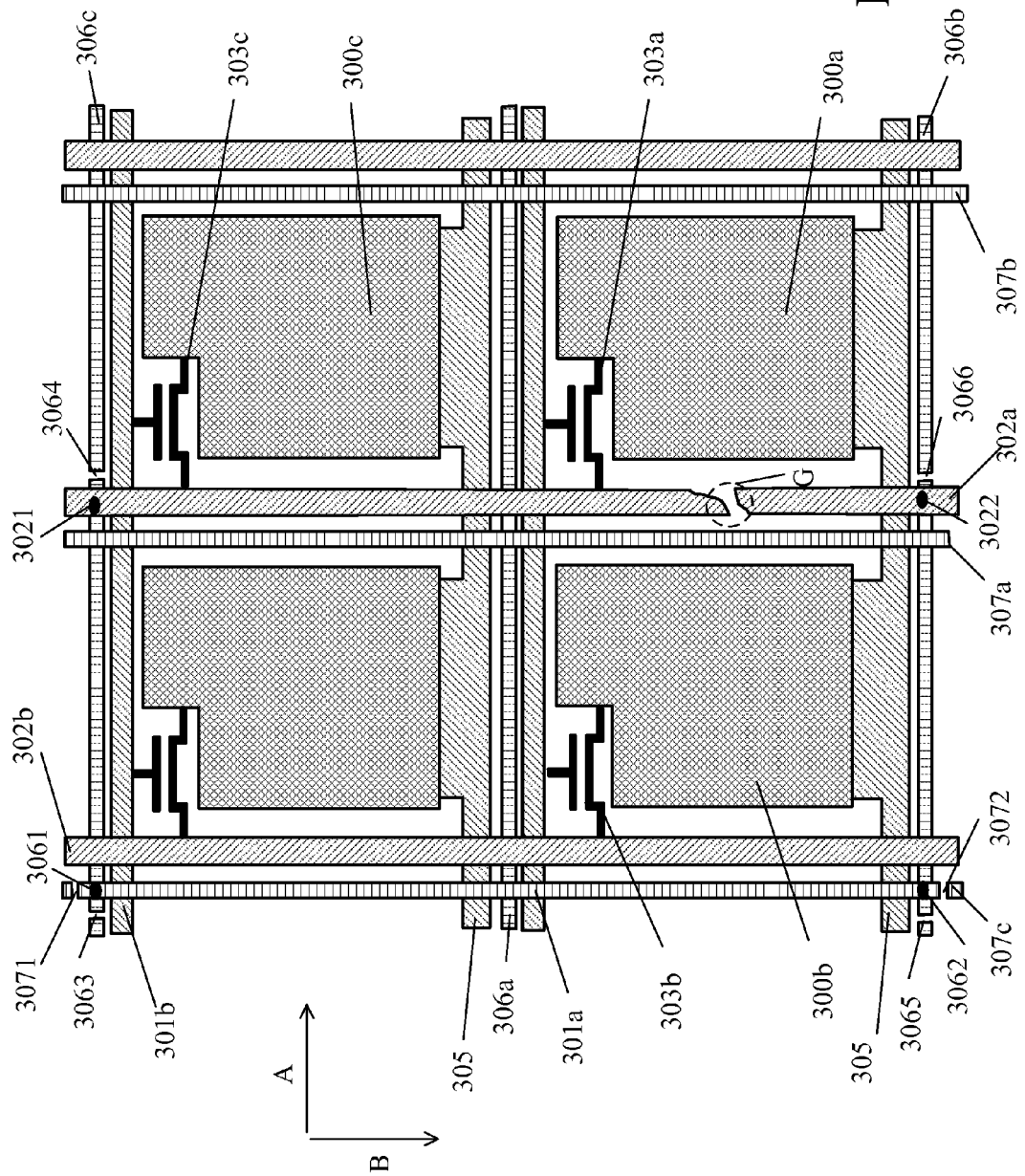
FIG. 7 is a schematic diagram showing that the flat display panel in FIG. 5 has undergone repairs according to a fourth embodiment of the present invention.

Refer to FIG. 7, which is a schematic diagram showing that the flat display panel in FIG. 5 has undergone repairs according to a fourth embodiment of the present invention. The horizontal repair lines 306c and 306b are chosen to be a first and a second horizontal repair line, and the vertical repair line 307e is chosen to be a first vertical repair line. The first horizontal repair line 306c and the second horizontal repair line 306b have to be disposed on both sides of the pixel electrode 300a connected to the broken data line 302a.

Afterwards, laser cutting is performed on the first vertical repair line 307c to form a first cutting zone 3071 and a second cutting zone 3072. Laser cutting is also performed on the first horizontal repair line 306c and the second horizontal repair line 306b at both sides of the pixel electrode 300a to form a third cutting zone 3063 and a fourth cutting zone 3064, and a fifth cutting zone 3065 and a sixth cutting zone 3066, respectively. The two horizontal repair lines 306e and 306b and the pixel electrode 300a are located between the first cutting zone 3071 and the second cutting zone 3072. The first vertical repair line 307e and the broken data line 302a are located between the third cutting zone 3063 and the fourth cutting zone 3064 as well as between the fifth cutting zone 3065 and the sixth cutting zone 3066.

Next, laser is applied on the overlapping area 3021 of the first horizontal repair line 306c and the broken data line 302a to connect the two lines, on the overlapping area 3061 of the first horizontal repair line 306c and the first vertical repair line 307c to connect the two lines, on the overlapping area 3022 of the second horizontal repair line 306b and the broken data line 302a to connect the two lines, and finally on the overlapping area 3062 of the second horizontal repair line 306b and the first vertical repair line 307c to connect the two lines. As described above, the two vertical repair lines 306c and 306b and the vertical repair line 307c form a bypass route to bypass the breaking G on the data line 302a, so that data signals can detour the breaking G on the data line 302a and be transmitted smoothly through the bypass route.

It is notified that only two horizontal repair lines and one vertical repair fine near the broken data line 302a are chosen to be exemplified in FIG. 6 and FIG. 7 for brevity. However, it can be found in FIG. 6 and FIG. 7 that, for any broken data line, it practically allows to choose any two of the plurality of horizontal repair lines at both sides of the pixel electrode connected to the broken data line as well as any one of the plurality of vertical repair lines to form a bypass route to bypass the breaking G on the data line.

Figure 8:
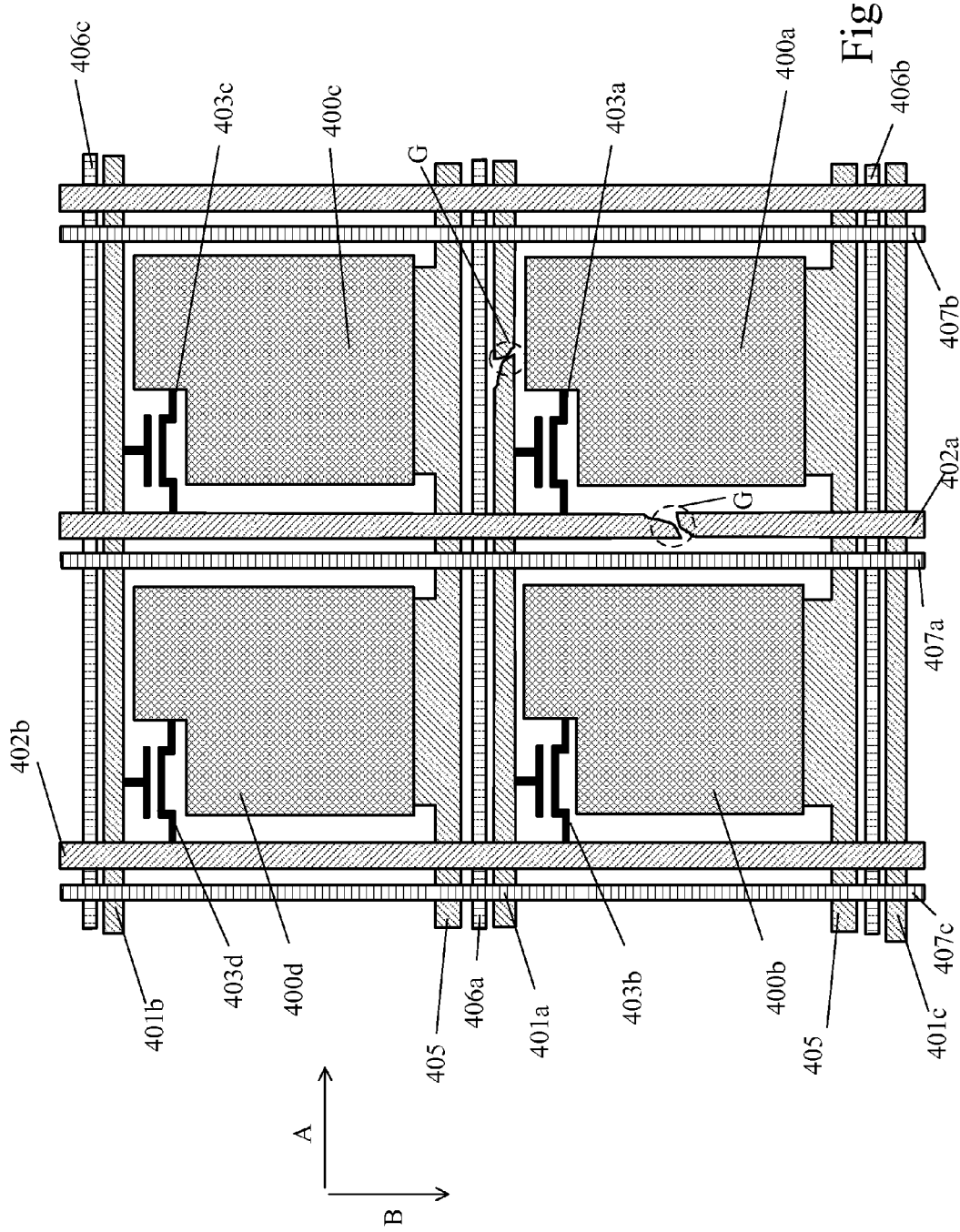
FIG. 8 is a partial schematic diagram of a flat display panel with a structure having repair lines before a broken scan line and a broken data line are repaired according to the present invention.

Refer to FIG. 8, which is a partial schematic diagram of a flat display panel with a structure having repair lines before a broken scan line and a broken data line are repaired according to the present invention. The flat display panel comprises a plurality of pixel electrodes 400a-400d, a plurality of scan lines 401a-401c parallel to one another and extended along a first direction A, a plurality of data lines 402a-402c parallel to one another and extended along a second direction B, a plurality of switching transistors 403a-403d, a plurality of horizontal repair lines 406a-406c parallel to the scan line 401a, and a plurality of vertical repair lines 407a-407c parallel to the data line 402a. The second direction B is perpendicular to the first direction A. The switching transistor 403a can he a TFT. The switching transistor 403a has a gate coupled to the scan line 401a, a source coupled to the data line 402a, and a drain coupled to the pixel electrode 400a. The structure and connecting relation of the switching transistors 403b-403d are the same as that of the switching transistor 403a, so no further details are released hereafter. Upon receiving a scan signal transmitted through the scan line 401a, the switching transistor 403a conducts a data signal transmitted through the data line 402a to the corresponding pixel electrode 400a. A common line 405 outputs common voltage Vcom. LC molecules between the pixel electrode 400a and the common line 405 rotate to display different gray levels based on a voltage difference between the common voltage Vcom provided by the common line 405 and data voltage received by the pixel electrode 400a.

In cell processes, the PEP with a mask is used to form a plurality of scan lines 401a-401c and a plurality of horizontal repair lines 406a-406c simultaneously. The plurality of horizontal repair lines 406a-406c are disposed on one side of the plurality of scan lines 401a-401c one to one. Next, the PEP with another mask is used to form a plurality of data lines 402a-402c and a plurality of vertical repair lines 407a-407c simultaneously. The plurality of vertical repair lines 407a-407c are disposed on one side of the plurality of data lines 402a-402c one to one. Each of the plurality of scan lines 401a-401c and each of the plurality of data lines 402a-402c are probed to see if each of the lines is able to transmit signals normally during the cell process. Once one of the data lines and one of the scan lines are broken, data signals and scan signals cannot be transmitted, as breakings G in FIG. 8 show.

Figure 9:
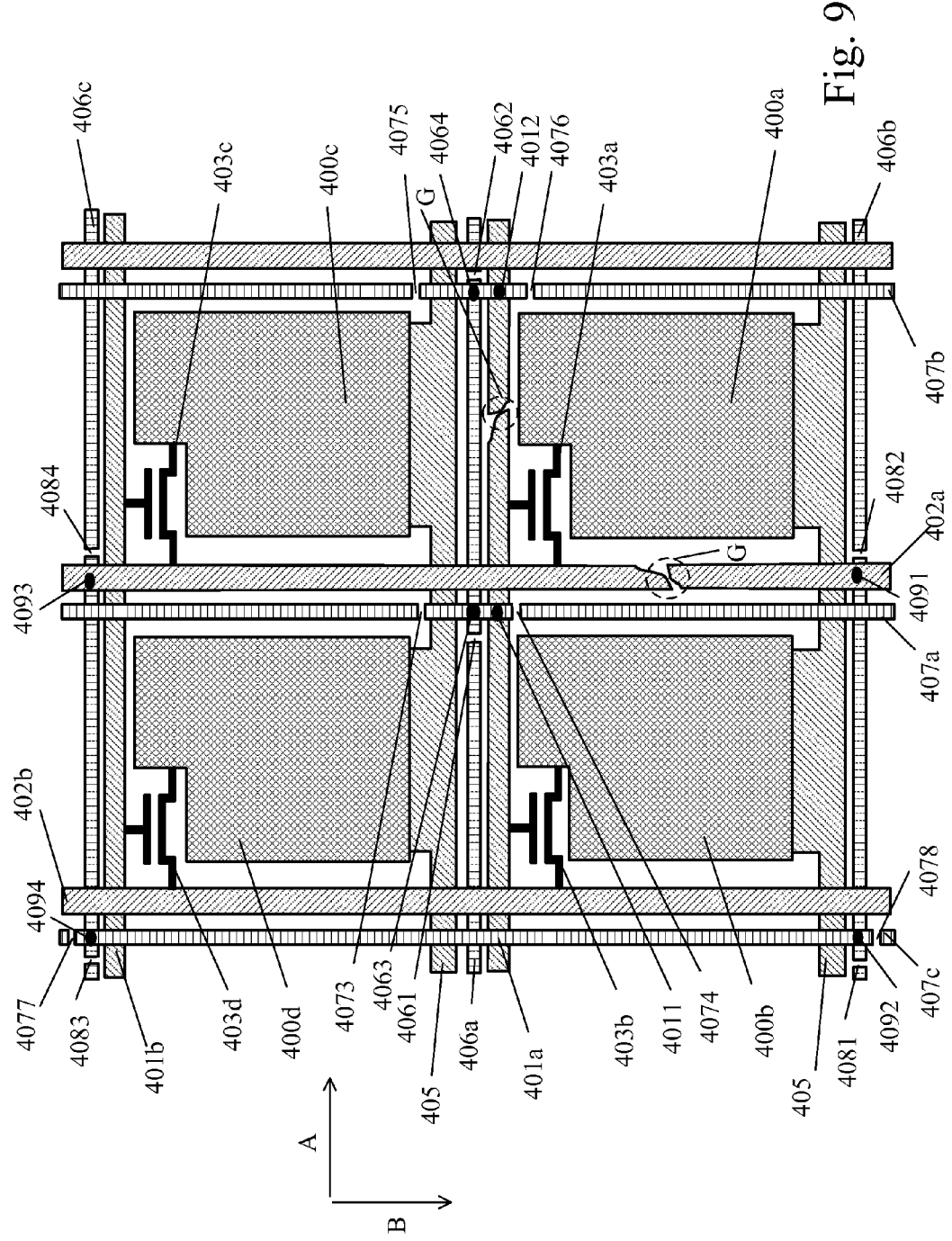
FIG. 9 is a partial schematic diagram showing that the flat display panel in FIG. 8 has undergone repairs according to a fifth embodiment of the present invention.

Refer to FIG. 9, which is a partial schematic diagram showing that the flat display panel in FIG. 8 has undergone repairs according to a fifth embodiment of the present invention. When both of the scan line 401a and the data line 402a are detected to have breakings G, any three of the plurality of horizontal repair lines, e.g. the horizontal repair lines 406a, 406b, and 406c are selected as a first, a second, and a third horizontal repair lines, while any three of the plurality of vertical repair lines, e.g. the vertical repair lines 407a, 407b, and 407c, are selected as a first, a second, and a third vertical repair lines. For simple description, the first horizontal repair line 406a, the first vertical repair line 407a, and the second vertical repair line 407b are used to repair the broken scan line 401a, so the first vertical repair line 407a and the second vertical repair line 407b have to be disposed on both sides of the pixel electrode 400a connected to the broken scan line 401a. In addition, the second horizontal repair line 406b, the third horizontal repair line 406c, and the third vertical repair line 407c are used to repair the broken data line 402a, so the second horizontal repair line 406b and the third horizontal repair line 406c have to be disposed on both sides of the pixel electrode 400a connected to the broken data line 402a.

Afterwards, laser cutting is performed on the first horizontal repair line 406a to form a first cutting zone 4061 and a second cutting zone 4062. Laser cutting is also performed on the two vertical repair lines 407a and 407b at both sides of the pixel electrode 400a to form a third cutting zone 4073 and a fourth cutting zone 4074, and a fifth cutting zone 4075 and a sixth cutting zone 4076, respectively. The two vertical repair lines 407a and 407b and the pixel electrode 400a are located between the first cutting zone 4061 and the second cutting zone 4062. The first horizontal repair line 406a and the broken scan line 401a are located between the third cutting zone 4073 and the fourth cutting zone 4074 as well as between the fifth cutting zone 4075 and the sixth cutting zone 4076.

In addition, laser cutting is performed on the third vertical repair line 407c to form a seventh cuffing zone 4077 and an eighth cuffing zone 4078. Also, laser cutting is performed on the two horizontal repair lines 406b and 406e to form a ninth cutting zone 4081 and a tenth cutting zone 4082, and an eleventh cuffing zone 4083 and a twelfth cutting zone 4084, respectively. The two horizontal repair lines 406b and 406c and the pixel electrode 400a are located between the seventh cutting zone 4077 and the eighth cutting zone 4078. The third vertical repair line 407c and the broken data line 402a are located between the ninth cutting; zone 4081 and the tenth cutting zone 4082 as well as between the eleventh cutting zone 4083 and the twelfth cutting zone 4084.

Subsequently, laser is applied to electrically connect the first vertical repair line 407a with the broken scan line 401a at the overlapping area 4011, to electrically connect the first vertical repair line 407a with the first horizontal repair line 406a at the overlapping area 4063, to electrically connect the second vertical repair line 407b with the broken scan line 401a at the overlapping area 4012, and to electrically connect the second vertical repair line 407b with the first horizontal repair line 406a at the overlapping area 4064. As described above, the two vertical repair lines 407a and 407b and the first horizontal repair line 406a form a bypass route to bypass the breaking G tarn the scan line 401a, so that scan signals can detour the breaking G and be transmitted smoothly through the bypass route.

Furthermore, laser is applied to electrically connect the second horizontal repair line 406b with the broken data line 402a at the overlapping area 4091, to electrically connect the second horizontal repair line 406b with the third vertical repair line 407c at the overlapping area 4092, to electrically connect the third horizontal repair line 406c with the broken data line 402a at the overlapping area 4093, and to electrically connect the third horizontal repair line 406c with the third vertical repair line 407c at the overlapping area 4094. As described above, the two horizontal repair lines 406b and 406e and the third vertical repair line 407c form a bypass route to bypass the breaking G of the data line 402a, so that data signals can detour and be transmitted smoothly to the switching transistors in the next row through the bypass route though the data line 402a is broken at the breaking G.

Figure 10:
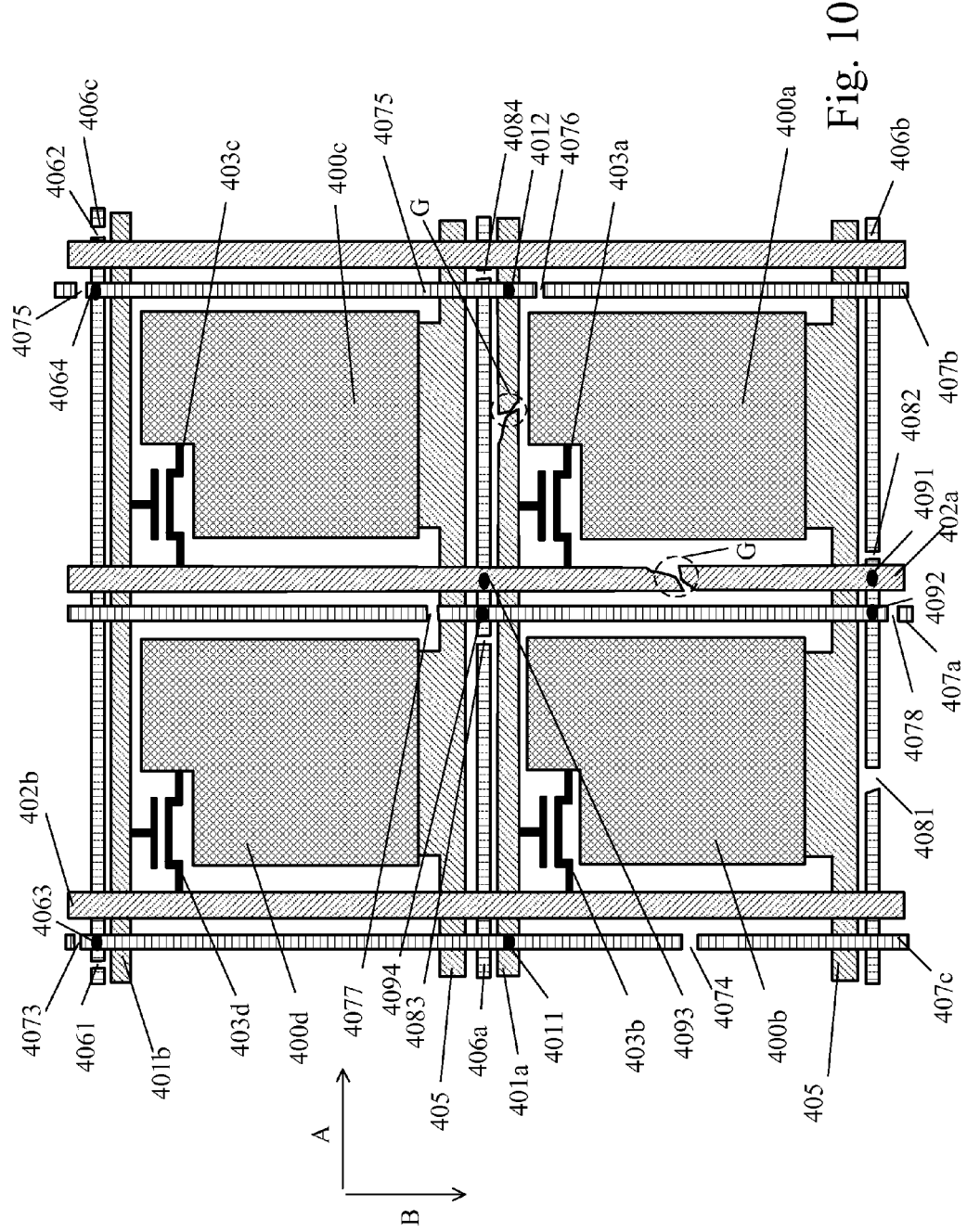
FIG. 10 is a partial schematic diagram showing that the flat display panel in FIG. 8 has undergone repairs according to a sixth embodiment of the present invention.

Refer to FIG. 10, which is a partial schematic diagram showing that the flat display panel in FIG. 8 has undergone repairs according to a sixth embodiment of the present invention. In this embodiment, when both of the scan line 401a and the data line 402a are detected to have breakings G, the horizontal repair lines 406c, 406b, and 406a are selected as a first, a second, and a third horizontal repair lines, while the vertical repair lines 407c, 407b, and 407a, are selected as a first, a second, and a third vertical repair lines. For simple description, the first horizontal repair line 406; the first vertical repair line 407c, and the second vertical repair line 407b are used to repair the broken scan line 401a, so the first vertical repair line 407c and the second vertical repair line 407b have to be disposed on both sides of the pixel electrode 400a connected to the broken scan line 401a. In addition, the second horizontal repair line 406b, the third horizontal repair line 406a, and the third vertical repair line 407a are used to repair the broken data line 402a, so the second horizontal repair line 406b and the third horizontal repair line 406a have to be disposed on both sides of the pixel electrode 400a connected to the broken data line 402a.

Afterwards, laser cutting is performed on the first horizontal repair line 406c to form a first cutting zone 4061 and a second cutting zone 4062. Laser cutting is also performed on the two vertical repair lines 407c and 407b at both sides of the pixel electrode 400a to form a third cutting zone 4073 and a fourth cutting zone 4074, and a fifth cutting zone 4075 and a sixth cutting zone 4076, respectively. The two vertical repair lines 407c and 407b and the pixel electrode 400a are located between the first cutting zone 4061 and the second cutting zone 4062. The first horizontal repair line 406c and the broken scan line 401a are located between the third cutting zone 4073 and the fourth cutting zone 4074 as well as between the fifth cutting zone 4075 and the sixth cutting zone 4076.

In addition, laser cutting is performed on the third vertical repair line 407a to form a seventh cutting zone 4077 and an eighth cutting zone 4078. Also, laser cutting is performed on the two horizontal repair lines 406b and 406a to form a ninth cutting zone 4081 and a tenth cutting zone 4082, and an eleventh cutting zone 4083 and a twelfth cutting zone 4084, respectively. The two horizontal repair lines 406b and 406a and the pixel electrode 400a arc located between the seventh cutting zone 4077 and the eighth cutting zone 4078. The third vertical repair line 407a and the broken data line 402a are located between the ninth cutting zone 4081 and the tenth cutting zone 4082 as well as between the eleventh cutting zone 4083 and the twelfth cutting zone 4084.

Subsequently, laser is applied to electrically connect the first vertical repair line 407c with the broken scan line 401a at the overlapping area 4011, to electrically connect the first vertical repair line 407c with the first horizontal repair line 406c at the overlapping area 4063, to electrically connect the second vertical repair line 407b with the broken scan line 401a at the overlapping area 4012, and to electrically connect the second vertical repair line 407b with the first horizontal repair line 406c at the overlapping area 4064. As described above, the two vertical repair lines 407c and 407b and the first horizontal repair line 406c form a bypass route to bypass the breaking G on the scan line 401a, so that scan signals can detour the breaking G and be transmitted smoothly through the bypass route.

Furthermore, laser is applied to electrically connect the second horizontal repair line 406b with the broken data line 402a at the overlapping area 4091, to electrically connect the second horizontal repair line 406b with the third vertical repair line 407a at the overlapping area 4092, to electrically connect the third horizontal repair line 406a with the broken data line 402a at the overlapping area 4093, and to electrically connect the third horizontal repair line 406a with the third vertical repair line 407a at the overlapping area 4094. As described above, the two horizontal repair lines 406b and 406a and the third vertical repair line 407a form a bypass route to bypass the breaking 0 of the data line 402a, so that data signals can detour and be transmitted smoothly to the switching transistors in the next row through the bypass route though the data line 402a is broken at the breaking G.

It is notified that only the horizontal repair lines and the vertical repair lines near the broken scan tine 401a and the broken data line 402a are chosen to be exemplified in FIG. 9 and FIG. 10 for brevity. However, it can be found in FIG. 9 and FIG. 10 that, for any broken scan line or any broken data line, it is practically allows to choose any two of the plurality of vertical repair lines at both sides of the pixel electrode connected to the broken scan line as well as any one of the horizontal repair lines to form a bypass route to bypass the breaking G of the scan line. Meanwhile, it is also practically allows to choose any two of the horizontal repair lines at both sides of the pixel electrode connected to the broken data line as well as any one of the vertical repair lines to form a bypass route to bypass the breaking G of the data line.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:
1. A flat display panel, comprising:
a plurality of matrix-arranged pixel electrodes;
a plurality of scan lines, parallel to one another and extended along a first direction, for transmitting a scan signal;
a plurality of data lines, parallel to one another and extended along a second direction, the second direction being perpendicular to the first direction, far transmitting a data signal;
a plurality of switching transistors, coupled to the plurality of pixel electrodes, to the plurality of scan lines, and to the plurality of data lines one to one, each of the plurality of switching transistors used for receiving the scan signal transmitted through each of the plurality of scan lines coupled to each of the plurality of switching transistors and for conducting the data signal transmitted through each of the plurality of data lines coupled to each of the plurality of switching transistors to the corresponding pixel electrode;

a plurality of horizontal repair lines, parallel to the plurality of scan lines, the plurality of horizontal repair lines disposed on one side of the plurality of scan lines one to one; and a plurality of vertical repair lines, parallel to the plurality of data lines, the plurality of vertical repair lines disposed on one side of the plurality of data lines one to one;

wherein a first horizontal repair line is selected from the plurality of horizontal repair lines while a first vertical repair line and a second vertical repair line are selected from the plurality of vertical repair lines, when one of the plurality of scan lines is detected to be a broken scan line, causing a pixel electrode unable to receive the scan signal, the first and second vertical repair lines are disposed on both sides of the pixel electrode, respectively;

wherein a first cutting zone and a second cutting zone are formed on the first horizontal repair line, a third cutting zone and a fourth cutting zone are formed on the first vertical repair line, a fifth cutting zone and a sixth cutting zone are formed on the second vertical repair line, the first and second vertical repair lines are located between the first and second cutting zones, the first horizontal repair line and the broken scan line are located between the third and fourth cutting zones as well as between the fifth and sixth cutting zones, and the first and second vertical repair lines, respectively; are electrically connected to the broken scan line and the first horizontal repair line at their overlapping areas, 2. The flat display panel of claim 1, characterized in that: a second horizontal repair line and a third horizontal repair line from the plurality of horizontal repair lines are selected, while a third vertical repair line from the plurality of vertical repair lines is selected, when a data line coupled to the pixel unit which is coupled to the broken scan line is detected to be a broken data line, causing the data signal unable to be transmitted, wherein the second and third horizontal repair lines are disposed on both sides of the pixel electrode, respectively, wherein a seventh cutting zone and an eighth cutting zone are formed on the third vertical repair line, a ninth cutting zone and a tenth cutting zone are formed on the second horizontal repair line and an eleventh cutting zone and a twelfth cutting zone are formed on the third horizontal repair line at both sides of the pixel electrode, both of the second and third horizontal repair lines are disposed between the seventh and eighth cutting zones, both of the second and third vertical repair lines and the broken data line are disposed between the ninth and tenth cutting zones as well as between the eleventh and twelfth cutting zones, the second :LS horizontal repair line is connected to the broken data line and to the third vertical repair line at their overlapping areas, and the third horizontal repair line is connected to the broken data line and to the third vertical repair line at their overlapping areas.

3. A flat display panel, comprising:

a plurality of matrix-arranged pixel electrodes;

a plurality of scan lines, parallel to one another and extended along a first direction, for transmitting a scan signal;

a plurality of data lines, parallel to one another and extended along a second direction, the second direction being perpendicular to the first direction, for transmitting a data signal;

a plurality of switching transistors, coupled to the plurality of pixel electrodes, to the plurality of scan lines, and to the plurality of data lines one to one, each of the plurality of switching transistors used for receiving the scan signal transmitted through each of the plurality of scan lines coupled to each of the plurality of switching transistors and for conducting the data signal transmitted through each of the plurality of data lines coupled to each of the plurality of switching transistors to the corresponding pixel electrode;

a plurality of horizontal repair lines, parallel to the plurality of scan lines, the plurality of horizontal repair lines disposed on one side of the plurality of scan lines one to one; and a plurality of vertical repair lines, parallel to the plurality of data lines, the plurality of vertical repair lines disposed on one side of the plurality of data lines one to one;

wherein a first horizontal repair line and a second horizontal repair line are selected from the plurality of horizontal repair lines, while a first vertical repair line is selected from the plurality of vertical repair lines, when one of the plurality of data lines is detected to be a broken data line, causing a pixel electrode unable to receive the data signal, the first and second horizontal repair lines disposed on both sides of the pixel electrode, respectively;

wherein a first cutting zone and a second cutting zone are formed on the first vertical repair line, a third cutting zone and a fourth cutting zone are formed on the first horizontal repair line and a fifth cutting zone and a sixth cutting zone are formed on the second horizontal repair line at both sides of the pixel electrode, the first and second horizontal repair lines and the pixel electrode are located between the first and second cutting zones, the first vertical repair line and the broken scan line are located between the third and fourth cutting zones as well as between the fifth and sixth cutting zones, and the first horizontal repair line is electrically connected to the second horizontal repair line at the overlapping area of the broken data line and the first vertical repair line.

4. A method of repairing a flat display panel, the flat display panel comprising a plurality of matrix-arranged pixel electrodes, a plurality of scan lines parallel to one another and extended along a first direction, a plurality of data lines parallel to one another and extended along a second direction, a plurality of switching transistors, a plurality of horizontal repair lines parallel to the plurality of scan lines, and a plurality of vertical repair lines parallel to the plurality of data lines, the second direction being perpendicular to the first direction, the plurality of switching transistors coupled to the plurality of pixel electrodes, to the plurality of scan lines, and to the plurality of data lines one to one, each of the plurality of switching transistors used for receiving the scan signal transmitted through each of the plurality of scan lines coupled to each of the plurality of switching transistors and for conducting the data signal transmitted through each of the plurality of data lines coupled to each of the plurality of switching transistors to the corresponding pixel electrode, the plurality of horizontal repair lines disposed on one side of the plurality of scan lines one to one, the plurality of vertical repair lines disposed on one side of the plurality of data lines one to one, the method comprising:

detecting whether any of the plurality of the scan line is to be a broken scan line;

selecting a first horizontal repair line from the plurality of horizontal repair lines and selecting a first vertical repair line and a second vertical repair line from the plurality of vertical repair lines, when one of the plurality of scan lines is detected to be the broken scan line, causing a pixel electrode unable to receive the scan signal, the first and second vertical repair tines being disposed on both sides of the pixel electrode, respectively;

forming a first cutting zone and a second cutting zone on the first horizontal repair line, forming a third cutting zone and a fourth cutting zone on the first vertical repair line, forming a fifth cutting zone and a sixth cutting zone on the second vertical repair line, the first and second vertical repair lines being located between the first and second cutting zones, the first horizontal repair line and the broken scan line being located between the third and fourth cutting zones as well as between the fifth and sixth cutting zones;

connecting the first and second vertical repair lines with the broken scan line and the first horizontal repair line at their overlapping areas, respectively.

5. The method of repairing a flat display panel of claim 4, characterized in that the method further comprises:

detecting Whether a data line coupled to the pixel unit which is coupled to the broken scan line is detected to be a broken data line;

selecting a second horizontal repair line and a third horizontal repair line from the plurality of horizontal repair lines, and selecting a third vertical repair line from the plurality of vertical repair lines, when the data line coupled to the pixel unit which is coupled to the broken scan line is detected to be a broken data line, causing the data signal unable to be transmitted, the second and third horizontal repair lines being disposed on both sides of the pixel electrode, respectively;

forming a seventh cutting zone and an eighth cutting zone on the third vertical repair line, forming a ninth cutting zone and a tenth cutting zone on the second horizontal repair line, and forming an eleventh cutting zone and a twelfth cutting zone on the third horizontal repair line at both sides of the pixel electrode, both of the second and third horizontal repair lines being disposed between the seventh and eighth cutting zones, both of the second and third vertical repair lines and the broken data line being disposed between the ninth and tenth cuffing zones as well as between the eleventh and twelfth cutting zones; and connecting the second horizontal repair line with the broken data line and with the third vertical repair line at their overlapping areas, and connecting the third horizontal repair line with the broken data line and with the third vertical repair line at their overlapping areas.

6. The method of repairing a flat display panel of claim 4, characterized in that the steps of forming the first cutting zone, the second cutting zone, forming the third cutting zone and the fourth cutting zone, and forming the fifth cutting zone and the sixth cutting zone are performed by using laser.

7. The method of repairing a flat display panel of claim 4, characterized in that the step of connecting the first and second vertical repair lines with the broken scan line and the first horizontal repair line are performed by using laser.

8. A method of repairing a flat display panel, the flat display panel comprising a plurality of matrix-arranged pixel electrodes, a plurality of scan lines parallel to one another and extended along a first direction, a plurality of data lines parallel to one another and extended along a second direction, a plurality of switching transistors, a plurality of horizontal repair lines parallel to the plurality of scan lines, and a plurality of vertical repair lines parallel to the plurality of data lines, the second direction being perpendicular to the first direction, the plurality of switching transistors coupled to the plurality of pixel electrodes, to the plurality of scan lines, and to the plurality of data lines one to one, each of the plurality of switching transistors used for receiving the scan signal transmitted through each of the plurality of scan lines coupled to each of the plurality of switching transistors and for conducting the data signal transmitted through each of the plurality of data lines coupled to each of the plurality of switching transistors to the corresponding pixel electrode, the plurality of horizontal repair lines disposed on one side of the plurality of scan lines one to one, the plurality of vertical repair lines disposed on one side of the plurality of data lines one to one, the method comprising:

detecting whether any of the plurality of the data line is to be a broken data line;

selecting a first horizontal repair line and a second horizontal repair line from the plurality of horizontal repair lines and selecting a first vertical repair line from the plurality of vertical repair lines, when one of the plurality of data lines is detected to he the broken data line, causing a pixel electrode unable to receive the scan signal, the first and second horizontal repair lines being disposed on both sides of the pixel electrode, respectively;

forming a first cutting zone and a second cutting zone on the first vertical repair line, forming a third cutting zone and a fourth cutting zone on the first horizontal repair line, forming a fifth cutting zone and a sixth cutting zone on the second horizontal repair line, the first and second horizontal repair lines and the pixel electrode being located between the first and second cutting zones, the first vertical repair line and the broken data line being located between the third and fourth cutting zones as well as between the fifth and sixth cutting zones; and connecting the first and second horizontal repair lines with the broken data line and the first vertical repair line at their overlapping areas, respectively.

9. The method of repairing a flat display panel of claim 8, characterized in that the steps of forming the first cutting zone, the second cutting zone, forming the third cutting zone and the fourth cutting zone, and forming the fifth cutting zone and the sixth cutting zone are performed by using laser.

10. The method of repairing a flat display panel of claim 8, characterized in that the steps of connecting the first and second horizontal repair lines with the broken data line and the first vertical repair line are performed by using laser.

* * * * *